United States Patent [19]
Grant

[11] 3,972,485
[45] Aug. 3, 1976

[54] ENDLESS-ROLL FILM CARTRIDGE

[75] Inventor: Frederic F. Grant, Bellflower, Calif.

[73] Assignee: Technicolor Corporation, Hollywood, Calif.

[22] Filed: Jan. 9, 1975

[21] Appl. No.: 539,624

[52] U.S. Cl. .......................................... 242/55.19 A
[51] Int. Cl.² .......................................... B65H 17/48
[58] Field of Search .................. 242/55.19 A, 55.21, 242/194; 352/126, 128

[56] References Cited
UNITED STATES PATENTS

| | | | |
|---|---|---|---|
| 3,244,471 | 4/1966 | Mead | 242/71.1 X |
| 3,648,941 | 3/1972 | Merry | 242/55.19 A |
| 3,700,188 | 10/1972 | Bradford | 242/194 |

Primary Examiner—Edward J. McCarthy
Attorney, Agent, or Firm—Shapiro and Shapiro

[57] ABSTRACT

In an endless-roll film cartridge the problem of cyclical variation in film stepping distance (tick-tocking) is overcome by isolating the inertia of the coil of film from the segment of the film loop engaged by the drive claw, and by storing energy in the film segment returning to the coil each time the film is advanced by the claw and then releasing the energy to move the coil preparatory to the next advancement of the film by the claw. Variable blends provide compliance in the film path at opposite ends of the segment engaged by the claw, one of the bends being controlled by a pocket in a guide defining the path of the film segment returning to the coil.

15 Claims, 5 Drawing Figures

ENDLESS-ROLL FILM CARTRIDGE

BACKGROUND OF THE INVENTION

This invention is concerned with film cartridges, and more particularly with endless-roll film cartridges employed in motion picture projectors.

U.S. Pat. No. 3,244,471, granted Apr. 5, 1966, assigned to the same assignee as the present invention, and incorporated herein in its entirety by reference, discloses an endless-roll film cartridge for use with motion picture projectors, for example. The cartridge comprises a housing containing the film roll, which includes a coil of film in a compartment of the housing and a loop extending between the outer and inner convolutions of the coil. A segment of the loop is trained past an aperture in the housing at which film perforations are engaged by a film drive claw, the film being held against the aperture by a pressure plate. The coil of film is moved solely by compressional forces in the film segment returning to the coil and by tensile forces in the film segment leaving the coil, such forces being produced in the loop by the action of the drive claw. When the film is driven at very low speeds (of the order of two to three frames per second or slower, for example), there is often a cyclical variation in stepping distance (tick-tocking) as the claw advances the film from frame to frame. It has been found that the problem occurs as the main body of the film in the cartridge completes its advance from one step and presents an inertia load to the next advance. It has been discovered that the condition of this inertia load (tightness and placement of the coil and the amount of slack in the loop) is affected by the condition of the inertia load prior to the film advance. Thus it is possible, in some instances of cartridge loading conditions (film loop total length, film stiffness, lubrication, pressure plate force, etc.) that cannot be precisely controlled, for the system to shift the inertia loading condition in a rhythmic way. The reaction on the claw causes the film to be advanced a slightly shortened step and then a slightly lengthened step, with each step variation the result of the previous variation, so that the projected image moves up and down alternately as much as 10 to 15 percent of its height on successive steps.

SUMMARY OF THE INVENTION

It is accordingly a principal object of the present invention to provide an improved film cartridge which overcomes the foregoing problem.

Briefly stated, in accordance with a preferred embodiment of the present invention, the problem of ticktocking is overcome by providing film path compliance to isolate the inertia of the coil of film from the segment of the film loop engaged by the drive claw, and by storing energy in the film segment returning to the coil each time the segment engaged by the claw is advanced and releasing the energy to move the coil preparatory to the next advancement step. Isolation is achieved by bending the film resiliently at opposite ends of the film segment engaged by the claw, thereby to provide compliance, and the storage and release of energy is accomplished by varying the bending of part of the film returning to the coil, a curved pocket being provided in a guide defining the path of the returning film in order to control the bending.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE INVENTION

Figure 1:
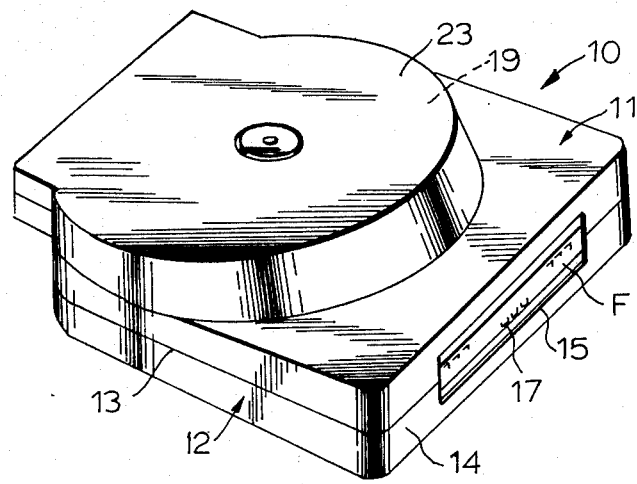
FIG. 1 is a perspective view of a film cartridge in accordance with the invention.
Figure 2:
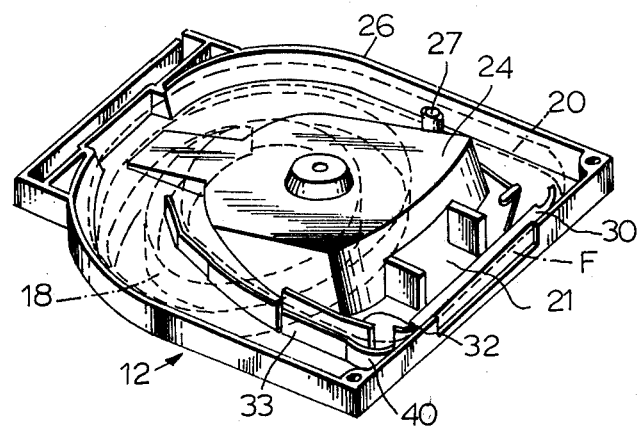
FIG. 2 is a similar view with one side of the cartridge removed to expose the interior.
Figure 3:
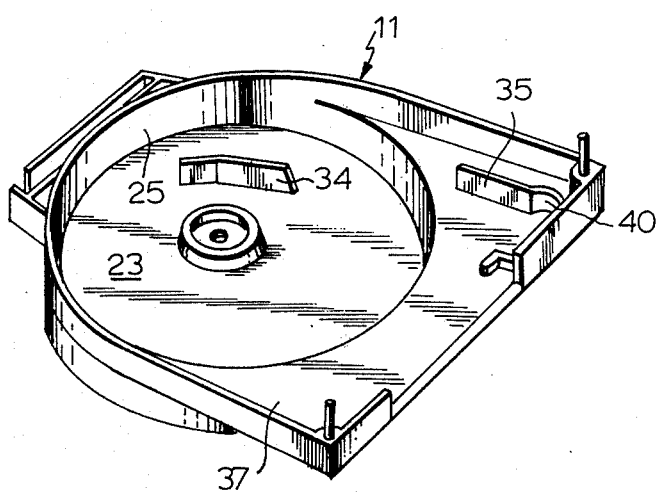
FIG. 3 is a perspective view of the removed side inverted to expose the interior.
Figure 4:
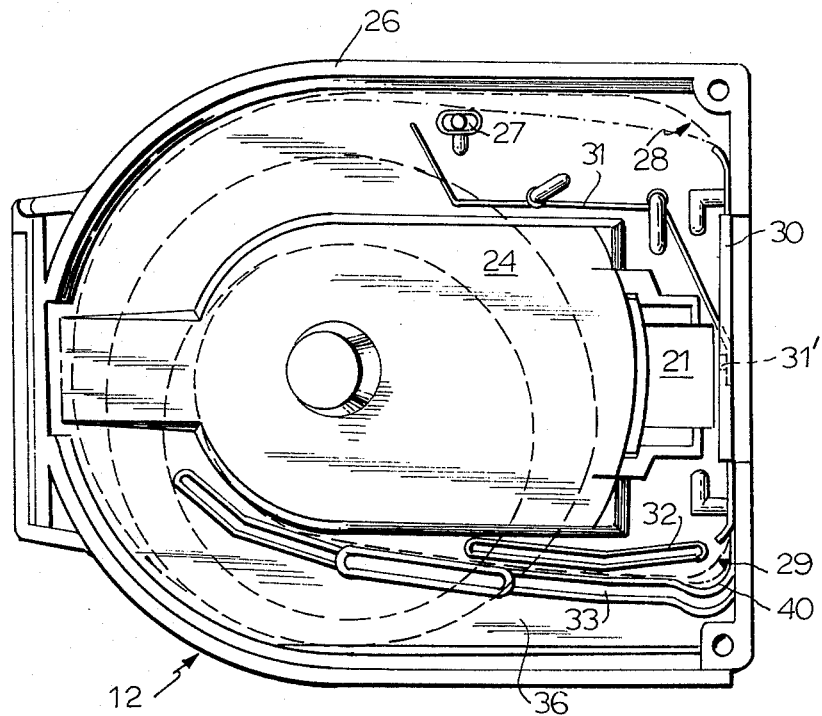
FIG. 4 is a side elevation view of the portion of the cartridge illustrated in FIG. 2.
Figure 5:
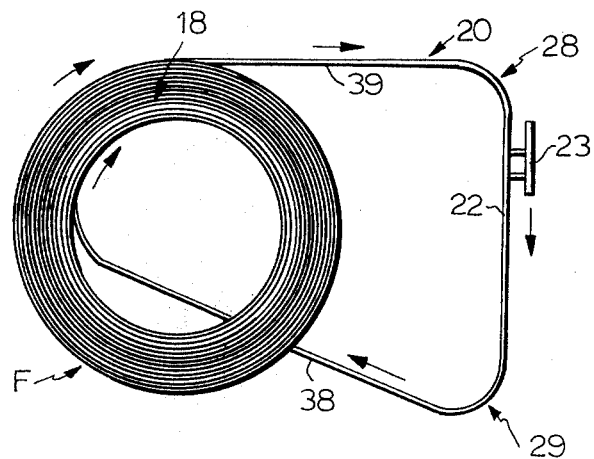
FIG. 5 is a diagrammatic view illustrating the film path and the drive claw.

The present invention is preferably incorporated in a film cartridge of the type disclosed in the aforesaid U.S. Pat. No. 3,244,471, although the invention has broader applicability. As set forth in that patent, the film cartridge 10 may comprise two hollow molded-plastic parts 11 and 12 separably joined along mating edges 13 as shown in FIG. 1. Together these parts form a housing having a front wall 14 with an aperture 15 therethrough, a film projection plane being defined just inside the inner surface of the front wall. The frame of the film being projected passes immediately behind the front wall, so that it is substantially coplanar with the film projection plane. Conventional marginal perforations or sprocket holes 17 are provided in the film F for engagement by the drive claw of the film transport mechanism. As shown in FIGS. 2, 4 and 5, the film F is an endless-roll including a coil portion 18 (without a spool) contained within a substantially cylindrical compartment 19 and a loop portion 20 connecting the outer convolution to the inner convolution of the coil.

The film cartridge 10 may be utilized with commercially available projectors, such as the Superloop 920 sold by the assignee of the present invention, the cartridge being oriented in the projector so that the film moves vertically at the projection plane, for example. When the cartridge is inserted into the projector, a light reflecting mirror or light source is moved into the cartridge through an opening 21 (FIG. 2), so that light is projected through a frame of film at the aperture 15. As indicated in FIG. 5, the segment 22 of the film loop 20 exposed at aperture 15 is engaged by a drive claw 23 and is subjected to a series of intermittent step motions along the film projection plane in a well known manner.

The film coil 18 is loosely confined in the cylindrical compartment 19 between parallel planar wall 23 and 24 and a cylindrical wall 25. The cylindrical compartment 19 is inclined as shown, so that the film coil 18 is inclined relative to the loop 20. As shown in FIGS. 2, 4 and 5, the loop 20 is constituted by film leaving the coil from the outer convolution thereof, passing the projection plane, and returning to the coil at the inner convolution. The loop extends from the outer convolution along wall 26, being confined by post 27 spaced from that wall, and then changes direction at 28 by 90° for movement along the front wall 14 past the aperture 15. Then the loop again changes direction at 29 for return movement to the coil 18. A pressure plate 30 biased against wall 14 by a spring 31, and provided with a framing aperture 31' through which a film frame is exposed to light from the light source, presses the film into the projection plane.

As the film leaves the projection plane it is guided in its return movement to the coil by guides 32, 33, 34, and 35. Guides 32 and 33 are integral with wall 36 of part 12 of the cartridge, while guides 34 and 35 are integral with walls 23 and 37, respectively, of part 11. When parts 11 and 12 are assembled as shown in FIG. 1, guides 34 and 35 are aligned with corresponding portions of guide 33. The guides are preferably tapered in cross-section, being thickest at their base where they merge with the sides of the cartridge, so that the film is guided essentially by its edge portions to reduce friction and wear.

Referring to FIG. 5, on each downward stroke of the claw 23, the claw advances segment 22 a short distance in a brief time interval, typically 1/6 inch in about 3 milliseconds. Ahead of this advancing film segment is the film segment 38 that is returning to the coil 18. Film segment 38 is under compression and is restrained from lateral buckling by the guides 32 – 35, so that it will return to the coil and impart some rotational impetus to the coil to allow take up of the film exiting from segment 22. Another film segment, 39, leaves the coil 18 and is moved toward film segment 22 under tension. It is apparent that the load of turning the coil 18 is carried jointly by segments 38 and 39, respectively in compression and tension, and that in a "movie mode" coil 18 can rotate at a variable speed that on the average is the speed at which claw 23 drives segment 22. The differences allowable are determined by the compliance available in segments 38 and 39 of the film.

As pointed out previously, at slow film speeds (of the order of two or three frames per second or slower) the main body of the film in the cartridge completes its advance from one step and presents an inertia load to the next advance step. Under some loading conditions, the inertia load varies in a rhythmic way and reacts on the claw so that the film is advanced a slightly shortened step and then a slightly lengthened step, each the result of the other, so that the projected image moves up and down as much as 10 to 15 percent of its height.

It has been discovered, in accordance with the present invention, that the solution to this tick-tocking problem requires that segment 22 of the film, and the drive claw 23, be isolated from the inertia of the main body of the film, in particular the coil 18, and requires the storing of energy in the film segment 38 each time film segment 22 is advanced by the drive claw and the subsequent release of that energy to move coil 18 to the proper position for the next advancement step of segment 22. In the preferred form of the invention this is accomplished by providing film path compliance at the regions 28 and 29. In each instance the compliance involves variable bending of the film. At region 28 the film is variably flexed due to advancement of segment 22 and the inertia of loop 18 so that the curvature of the film between post 27 and the pressure plate 30 varies as the claw moves segment 22 and then releases the film on its return stroke. At region 29 a curved pocket 40 is provided to accommodate and control the variable bending of the film. In the form shown, the pocket is conveniently a continuation of guides 33 and 35.

The natural tendency of the film to resist bending results in a resistance to penetration of the film bend at 29 into pocket 40, so that if there is resistance to film motion toward the coil 18 and the film advances at segment 22, the film bend at 29 penetrates into the pocket while bending is increased, but then the film comes out of the pocket, with decreased bending if the resistance to motion toward coil 18 is reduced. Likewise, if there is resistance to motion of the film from coil 18, film will bend more sharply over the curved end of pressure plate 30 at region 28, storing energy which later is released to assist in moving the coil 18 (although the principal coil moving force is from region 29).

The walls defining pocket 40, like the guides 32 – 35, are tapered in cross-section so that the film is contacted principally along the edge portions. The rubbing friction of the film in the pocket, along the edges of segment 38, and in coil 18 provides coulomb damping to the compliant system. The compliance isolates the main mass of the film in coil 18 from segment 22 of the film and from the claw 23 during the rapid pull down of segment 22. This isolation is sufficient to reduce the stresses on the claw and film and to make the response of film pull down at segment 22 immune to pre-conditions of coil 18 resulting from the previous pull down.

While film bends and spring-biased film guides have previously been employed in film transports to permit intermittent movement of the film at the projection aperture and continuous movement of the film elsewhere, and while variable bending of film, as in the so-called "Edison loop", has been utilized to advance film past a projection aperture intermittently, these concepts are quite different from the present invention in which the coil of an endless film roll is driven by compressional and tensile forces in the film loop joining the innermost and outermost convolutions of the coil and in which the problem of tick-tocking is solved by isolating the film segment driven by the claw from the coil while alternately storing and releasing energy in and from a portion of the film to insure proper movement of coil.

It is necessary to limit the force exerted by the film upon the claw and yet to store sufficient energy in the film to move the coil to the proper position for the next film advancement step within the time available. In a typical Super Eight film cartridge manufactured by the assignee of the present invention (using 0.006 inch Mylar 8 mm movie film lubricated with TFL-1 sold by the assignee of this invention), where the maximum film speed is 18 frames per second in a movie mode, the coil 18 must be moved to the proper position within 1/18th of a second. It has been found that the force exerted on the coil due to the energy stored in the pocket 40 should preferably vary between ¾ths of an ounce and 1½ ounces, with the outer limits being between ½ and 2 ounces. The pocket must have a radius large enough to prevent permanent bending deformation of the film and small enough to prevent random accordion folding of the film. The depth of the pocket must be sufficient to accept enough film for the required linear film movement (about 1/6 inch in the typical case) and should be sufficient to prevent film bottoming in normal operation. In the typical cartridge referred to above, the radius of curvature and depth of the pocket are about 0.156 inch, with the extremities of the pocket blending smoothly with the front wall 14 of the cartridge (which may be curved to continue the curvature of the pocket) and with the adjacent film guide 33. The junction with film guide 33 may be reversely curved with the same radius of curvature as the pocket so as to direct the film along the desired path to the coil 18. Under normal operation the film entering the pocket engages the pocket wall progressively as it continues to bend laterally outward into the pocket and store energy. The pocket controls flexure of the film as a buckled column and prevents permanent deformation of the film when the film bottoms in the pocket under conditions of abnormally high inertia of the coil 18.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. In a cartridge of the type having a housing containing an endless roll of film including a coil and a loop, said loop extending between inner and outer convolutions of the coil and having a segment adapted to be driven by intermittent film drive means, whereby the loop and the coil are moved, the improvement that comprises means for isolating the inertia of said coil from both ends of said segment.

2. A cartridge in accordance with claim 1, wherein said isolating means comprises means for providing film path compliance in said loop adjacent to said ends of said segment.

3. A cartridge in accordance with claim 2, wherein said housing includes guide means for directing the film returning to said coil from said segment, and wherein said means for providing compliance includes part of said guide means shaped to provide controlled variable bending of said film returning to said coil, whereby energy is stored in the film as it is increasingly bent during advancement of said segment by said drive means and is thereafter released to move said coil as the bending is decreased.

4. A cartridge in accordance with claim 3, wherein said part of said guide means comprising a concave pocket laterally outward of adjacent film.

5. A cartridge in accordance with claim 4, wherein the cartridge has a pressure plate for urging said film segment toward an apertured wall of said housing, and wherein said film has perforations adapted to be exposed at said aperture and engaged by said drive means moving along said aperture repetitively.

6. A cartridge in accordance with claim 5, wherein said loop changes direction upon leaving said aperture, and wherein said pocket is located where said loop changes direction.

7. A cartridge in accordance with claim 3, wherein said guide means comprises wall elements shaped to engaged and guide edge portions of the film.

8. A cartridge in accordance with claim 3, wherein the energy stored in said film is sufficient to drive said coil to a position at which the next advancement of said segment by said drive means can start without overloading said drive means.

9. A cartridge in accordance with claim 2, wherein said means for providing compliance comprises means for providing a variable bend in the film returning to said coil.

10. A cartridge in accordance with claim 2, wherein said cartridge includes means for providing coulomb damping for said compliance.

11. A cartridge in accordance with claim 1, wherein the film of said loop returns to the coil at the inner convolution thereof and leaves the coil at the outer convolution thereof, and wherein the movement of said coil is due entirely to the movement of said loop.

12. A method of preventing tick-tocking of picture film in a cartridge of the type having a housing containing an endless roll of film including a coil and a loop, a segment of which is moved intermittently by drive means, whereby the coil is moved by compression of the film of said loop returning to said coil and tension of the film of said loop leaving said coil, said method comprising isolating the inertia of said coil from both ends of said segment of said loop, storing energy during advancement of said segment by said drive means, and thereupon releasing said energy to move said coil preparatory to the next advancement of said segment by said drive means.

13. A method in accordance with claim 12, wherein said storing and releasing of energy comprises bending and unbending of said film.

14. A method in accordance with claim 13, wherein said film is constrained to return to said coil along a predetermined path, and wherein said bending and unbending comprises movement of said film laterally of said path.

15. A method in accordance with claim 13, wherein said film changes direction adjacent to the ends of said segment, and wherein said bending and unbending of said film comprises varying the bending of said film at said changes of direction.

* * * * *